Nov. 22, 1938.    C. D. WALLACH    2,137,324
AUTOMOBILE INSULATION
Filed Feb. 12, 1937    4 Sheets-Sheet 2
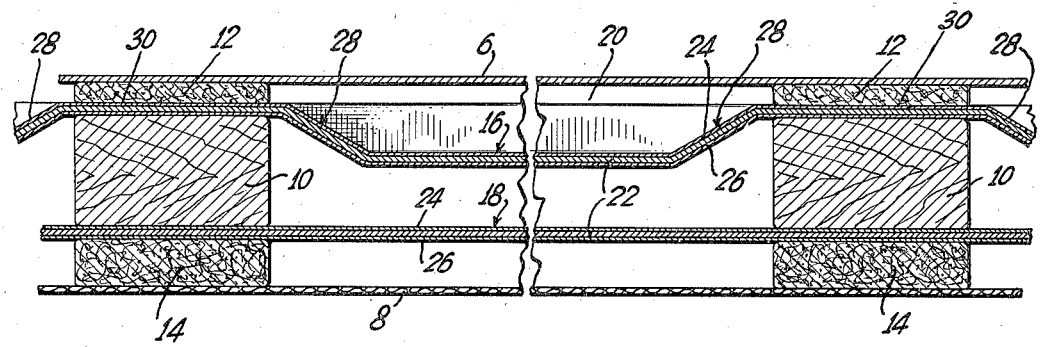
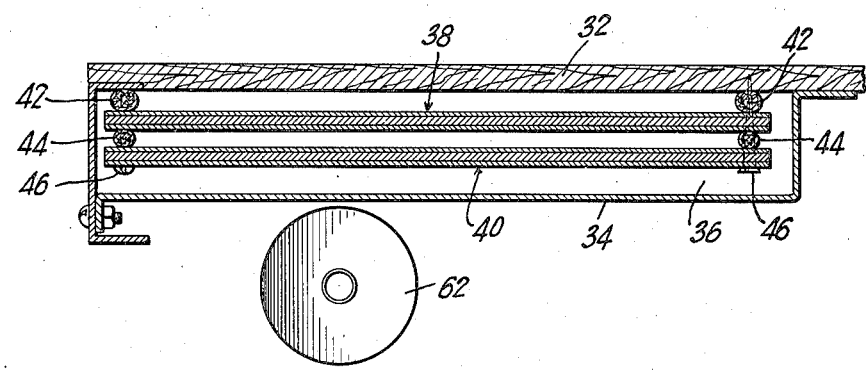
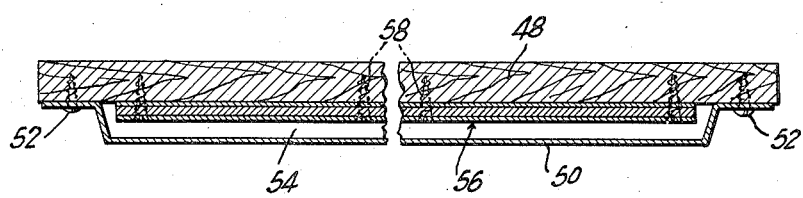
INVENTOR.
Carl D. Wallach
BY Frederic P. Warfield
ATTORNEYS.

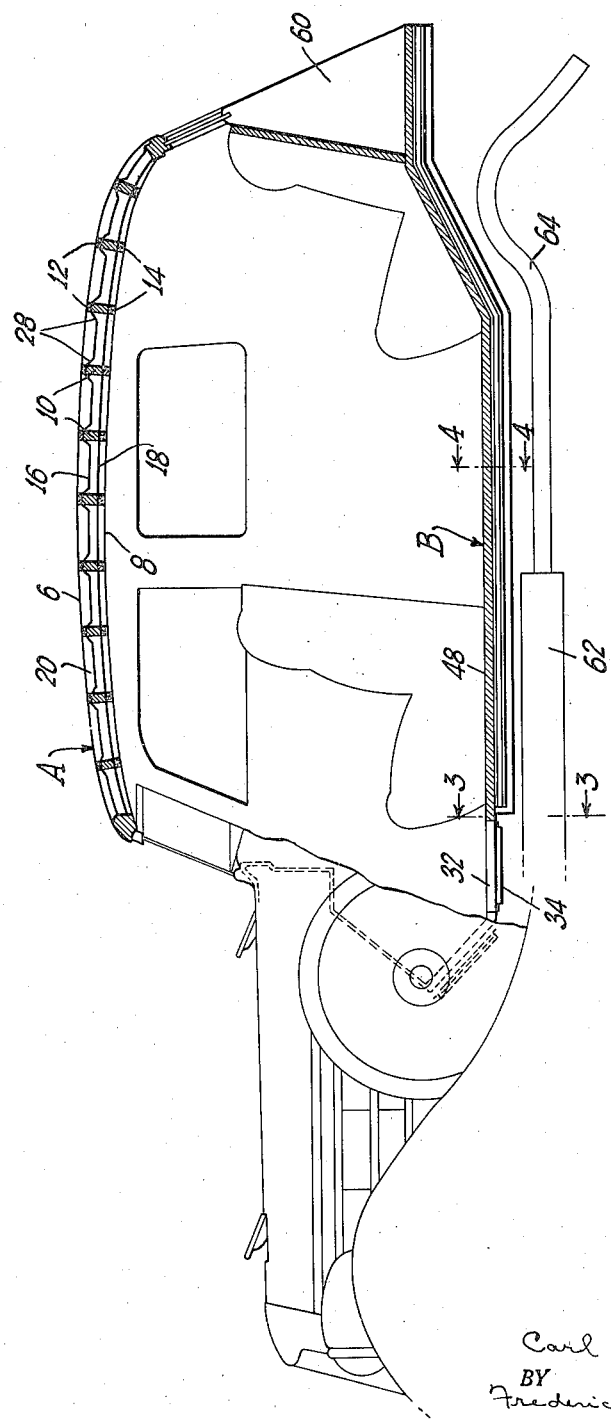

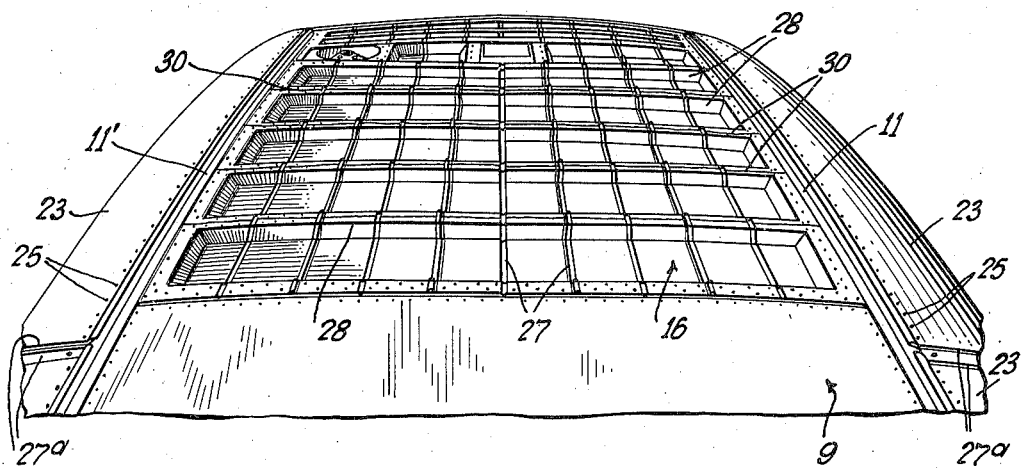
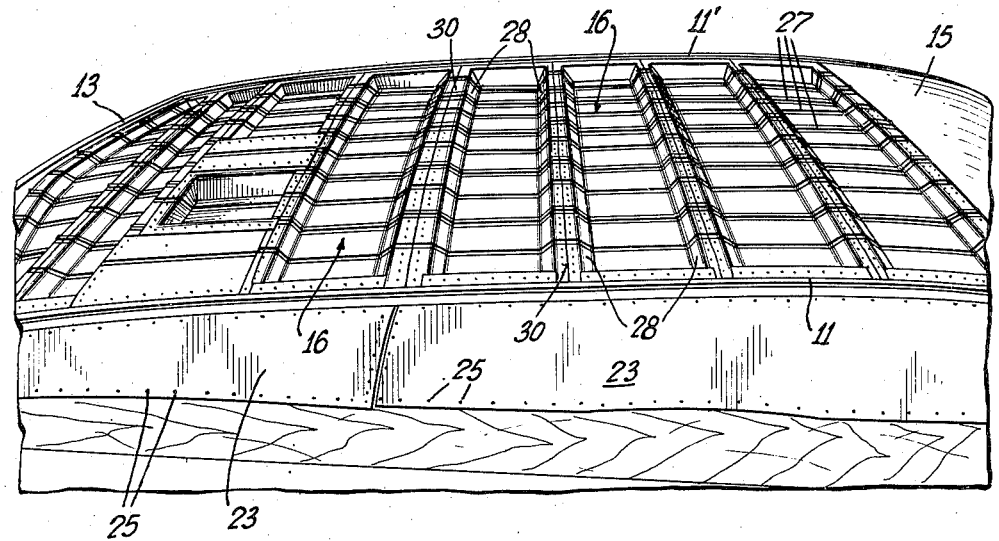

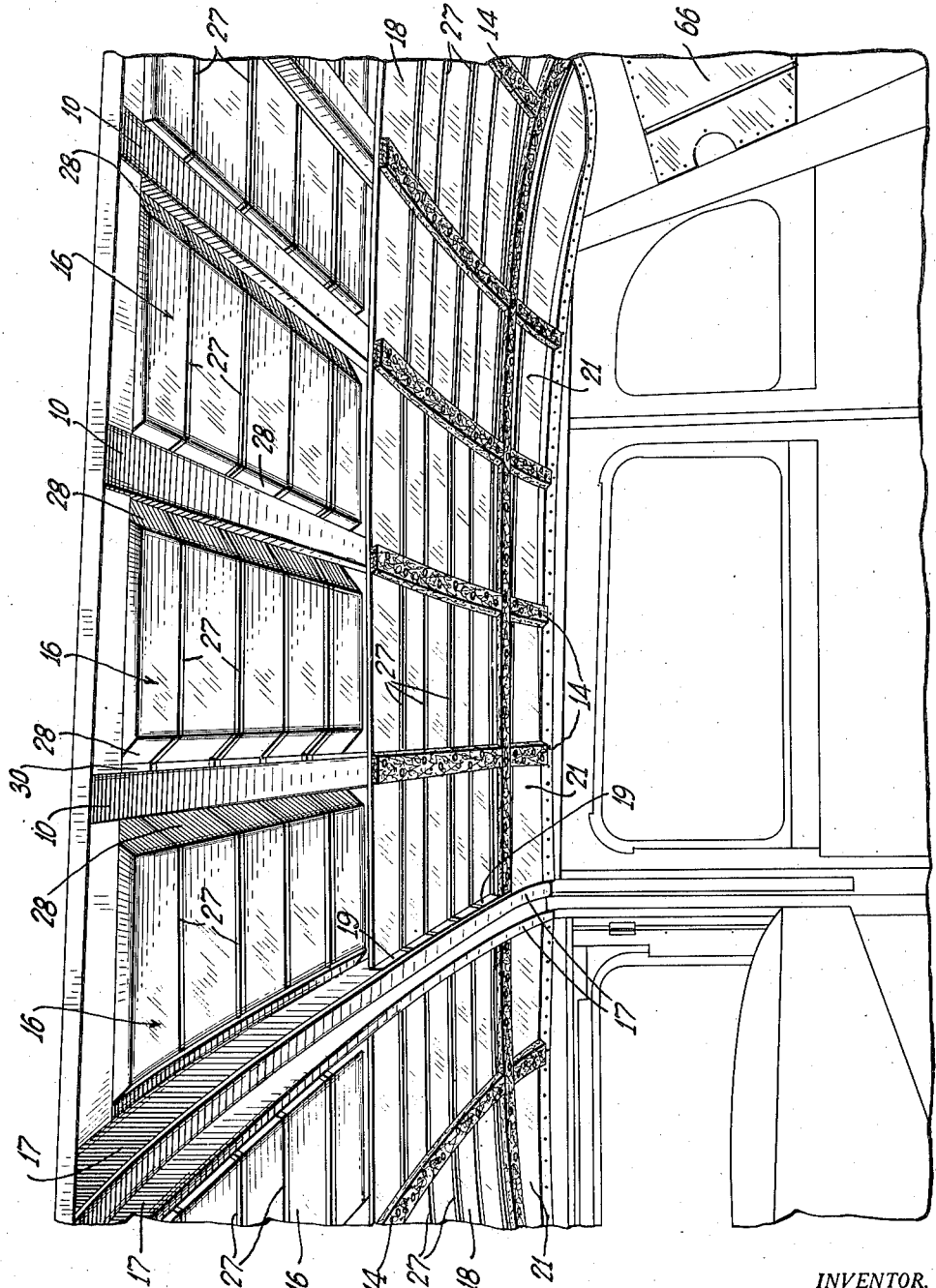

Patented Nov. 22, 1938

2,137,324

UNITED STATES PATENT OFFICE 2,137,324

AUTOMOBILE INSULATION

Carl D. Wallach, Newburgh, N. Y., assignor to American Flange & Manufacturing Co., Inc., New York, N. Y., a corporation of Illinois Application February 12, 1937, Serial No. 125,356

9 Claims. (Cl. 296—137)

The matter of providing thermal insulation wherever the same may be desired, is receiving a considerable degree of attention in order to inhibit, in an efficient manner the transmission of heat.

For many years it has been thought that the provision of heat insulation in any given installation involved necessarily the use of thick mass materials depending on the multitude of minute dead air cells that are contained in such a mass, for the inhibition of the transfer of heat from one side of the said mass to the other. In view of the fact that the use of thick masses of material for heat insulation is objectionable in many instances, there are occasions in which effective heat insulation has not been resorted to, because of the cumbersomeness of the installation of such materials.

One of the outstanding needed applications of heat insulation is in the automotive industry, for the heat insulation of passenger carrying automobiles and also for use in passenger carrying trailers which are becoming of rapidly increasing popularity.

It is well known that in the construction of automotive passenger vehicles the provision of adequate insulation is deficient against the passage of heat from the outside air in hot weather to the interior of the vehicle, especially when the latter is closed and standing for any length of time in a sunny location; also that, in cold weather, it is sometimes difficult to maintain a comfortable temperature in the interior of such vehicles.

This factor is becoming of increasing importance especially in promoting comfort within the increasingly popular trailer type of vehicles, which provide living quarters for a number of passengers on extended tours, wherein the maintenance of comfortable interior temperatures becomes of real importance.

The use of thick masses of insulation for such installations obviously is objectionable because, in order to obtain efficient insulating effects from such materials, excessive thicknesses thereof must be used, which becomes decidedly objectionable wherever space at best is very limited.

More recent investigations, however, regarding the manner in which heat is transmitted, have indicated that the practice of providing thick mass materials for heat insulation is unnecessary, and since such practice is open to inherent objections, efforts have been made to replace such thick mass materials with less expensive, more easily applied instrumentalities possessing as high, if not better, heat insulating properties, these instrumentalities being such as will be applicable readily anywhere when heat insulation may be found to be desirable.

It may be said that there are three ways in which heat is transmitted; they are convection, conduction and radiation. Heat is transmitted by convection when air currents passing over the warm surface are heated thereby and carry the heat away. Heat is transmitted by conduction through either solid, liquid, or gaseous materials, as for example, through the walls or fins of a radiator. Heat transmitted by radiation travels in straight lines and with practically no absorption by the air through which it passes, this being accomplished possibly by means of electromagnetic waves which carry heat energy.

A careful analysis of the proportion of heat transmitted in each of these three ways, show that radiation may account for as much as 50% or even more of the heat transmission, this value being known to be as high as from 66 to 85% of the total heat transfer. If heat flow is to be restricted, the control of radiation therefore is of high importance. Radiation in the wave length of about 0.4 to 0.76 mu (1 mu=0.001 m. m.) is known as visible light. Radiation of a shorter wave length is termed ultra-violet radiation, and radiation of longer wave length is known as infra-red radiation. The wave length of the energy radiated by a body increases as the temperature of the body is decreased, and bodies which radiate energy in the visible range must be quite hot, above 600° C. When, however, a body is in the neighborhood of room temperature, the wave length at which it radiates the most energy is in the neighborhood of 10 to 20 microns, which obviously is in the infra-red radiation.

It has been found that certain metals possess high infra-red reflectivity, that is to say, such metals reflect rather than transmit, heat waves of wave length lying in the infra-red portion of the spectrum, so that the major portion of the total heat does not penetrate the surface of the metal at all, but instead it is reflected back towards its source.

Of all common metals which have been found to reflect a high percentage of radiated heat, steel is one of the most efficient and practical, as well as the strongest and most durable; and, in this connection, it may be mentioned that a bright mirror-like surface is not necessary for steel to maintain this high reflectivity of heat, as the molecular structure of the surface is the most important factor and comparatively dull steel surfaces will reflect heat as well as brightly polished surfaces. A mirror which is the best reflector of light reflects practically no heat at all.

Materials other than metals reflect little or no radiated heat, but instead absorb this heat which is carried on through them by conduction. With such non-reflecting materials it is necessary to have a mass of the substance to retard this heat that is absorbed from being conducted on through the material. Such insulating materials operate on this principle employing the multitude of dead air cells in their structure to prevent this condition. Steel insulation does not absorb this heat at its surface, so that it does not need this mass to prevent the heat from passing through it. The dead air space maintained after installation prevents the remaining portion, conducted and convected heat from passing through.

Insulation of the above indicated character may be used in a wide variety of installations. As has been pointed out previously in this description, one of the outstanding needed applications of heat insulation is in the automotive industry for the maintenance of comfortable temperatures within passenger carrying vehicles; and it is an object of the present invention to provide a passenger carrying vehicle, such as an automobile or a trailer, with heat insulation of the above indicated type, such insulation being applied both to the top and floor of the vehicle, as will become apparent hereinafter.

A further object of the present invention is to provide an improved vehicle top structure.

A still further object of the invention is to provide improved means for thermally insulating vehicle tops.

Still another object of the invention is to provide thermal insulation means of the foregoing character which includes metallic sheets arranged to provide a plurality of superimposed and disconnected air spaces, the metal sheets being formed of a material of sufficient thickness to retain preformed shape, and having high reflective characteristics when exposed to radiation of wave lengths longer than the visible portion of the electromagnetic spectrum.

A further object is to provide a thermally insulated vehicle top arrangement that not only insures high insulation efficiency but also serves to strengthen the vehicle top and to lengthen materially the life of the same.

A still further object of the invention is to provide the floor of a vehicle with insulation of the above-indicated character, wherein the usual appearance of the vehicle floor is preserved, and at the same time there is enabled to be had the usual access to batteries and the like through the floor, as is provided customarily.

Additional objects of the invention are to provide insulation means of the foregoing character adapted to insulate in a substantially uniform manner throughout the life of the structure insulated; to provide an insulated body structure which is substantially completely protected against the transmission of infra-red heat waves, but which is not only simple, but quite inexpensive; and to provide an insulated top structure that may be easily and cheaply applied to both new and old vehicle tops, and to flooring as well.

Further objects and advantages of the present improved construction will become apparent as the description proceeds, and the features of novelty will be pointed out in particularity in the appended claims; and the invention accordingly comprises the features of construction, combination of elements, and arrangement of parts, which will be exemplified in the construction hereinafter set forth, and the scope of the application of which will be indicated in the claims.

The present invention will be understood more readily by reference to the accompanying drawings, which show illustrative embodiments of the invention, showing details of suitable construction for insulating the top and flooring of a passenger carrying motor vehicle.

In the drawings,

Fig. 1 represents a sectional elevation of an automobile body provided with thermal insulation of the present invention, Fig. 2 represents an enlarged fragmentary detail of the top construction, the view being shown also in sectional elevation, Fig. 3 is a fragmentary sectional detail showing particulars of the application of thermal insulation as applied to the usual removable floor board of an automobile, the view being taken on the line 3—3 of Fig. 1, looking in the direction of the arrows, Fig. 4 is a fragmentary sectional elevation of the floor construction provided with thermal insulation in accordance with the present invention, the view being taken on the line 4—4 of Fig. 1, looking in the direction of the arrows.

Fig. 5 is an external perspective longitudinal view of the top of an automobile body provided with the improved insulation of the present invention, showing details of its character and installation.

Fig. 6 is a view similar to Fig. 5, but looking transversely across the top.

Fig. 7 is an interior perspective view showing details of the installation as viewed from the interior of the body.

In accordance with the present invention, the floor, top, and other portions of an automobile body are thermally insulated by a metallic insulating material which reflects most of the heat rays which fall upon it. Such a material need not appear to the eye to be capable of reflecting very well. To the eye it may even have a leaden cast. It is within the scope of the invention that the material does not readily oxidize or rust and that it may be applied as a rust-preventing coating to supporting substances without the heat reflectivity of the final product being substantially diminished.

In those cases wherein the material is added to an underlying layer, it is often desirable that the latter be self-supporting and of a certain rigidity as well as a certain capacity to bend.

When it is desired that the non-oxidizing, coated, heat-reflecting product should have considerable strength the, or an, inner layer may be metallic. An alloy or mixture of lead and tin, although it is not excessively bright to the eye, has been found to reflect quite a high percentage of infra-red, i. e., heat rays incident thereon. This alloy also has the property of preventing rust even when applied as a very thin surface upon metals which oxidize, such as steel. A preferred form of a coated product having the desired heat-insulating properties has been found to be terne plate.

Terne plate is a commercial product and comprises a sheet of common, commercial or black steel with its surfaces completely coated with a layer of lead-tin alloy. The latter usually contains about 85% lead and 15% tin. Of course, other supporting sheets may be used with the alloy, if it is not used alone, and the percentage of tin may run between approximately 10 and 30;

and this terne plate and similar products possess high reflective characteristics when exposed to infra-red radiations, as has been indicated above.

It will be apparent, of course, that the present invention is applicable either to motor vehicles of the so-called "metal" type of top, or to vehicles of older construction, the installation of the improved insulating means being accomplished very readily in any type of vehicle body construction.

Referring more particularly to the drawings, and especially to Fig. 1, there is shown rather diagrammatically a sectional elevation of the passenger carrying compartment of any standard type of automotive vehicle, which includes a top A and a floor B.

The top structure may be supported by the vehicle body structure in any conventional manner, and it includes an outer top member 6 and an inner member 8, which may be a fabric or the like which is adapted to serve as the inner top finishing cover.

The top structure also includes the transversely extending ribs 10, which are secured in the usual way, not shown, to the body of the vehicle, and which form reinforcing and spacing members for the outer and inner elements 6 and 8, respectively of the top. These ribs 10 may be formed suitably of wood, and have their upper and lower horizontal surfaces provided with felt spacers 12 and 14, as will be apparent from the enlarged details of Fig. 2. These felt spacers are contiguous to the outer top member 6 and the inner fabric finishing member 8, and they also provide means for holding the thermal insulating layers 16 and 18 in proper position in the air space 20 between the outer and inner top members. The details of this construction will be described more fully hereinafter.

The outer top member 6 and the inner top finishing fabric cover 8 define the opposite sides of a substantially planar air space 20, which is, according to the present invention, insulated against the transfer of heat by radiation, conduction and convection. The structure for insulating the space 20 will now be described.

In the space 20 there are mounted between the ribs 10 and the felt spacers 12 and 14, a plurality of generally similar thin metallic sheets defining the upper and lower insulating panels 16 and 18, of not excessive thickness, a comparatively small fraction of an inch being amply thick while enabling the sheets to take readily and to retain a preformed shape. These metallic sheets are also formed of a comparatively inexpensive material, the exposed surfaces of which have high reflective characteristics when exposed to radiation of longer wave lengths than the visible portion of the spectrum, or, in other words, which have high reflective characteristics when exposed to infrared heat waves. One material that well serves this purpose is an inexpensive metallic material, such as, for instance, commercial black steel, which may be coated with an alloy of lead and tin, composed of approximately 70% or more of lead and the remainder tin. Since this coating is in itself an efficient reflector of infra-red waves, any backing having sufficient rigidity to take and to retain a desired preformed shape may be used as a reinforcing core for the thermally insulating sheets.

In the drawings, as in Fig. 2, the core is represented by the numeral 22, while the said alloy coating therefor is indicated by the layers 24 and 26.

The installation of the insulation in a standard type of automobile body is shown in detail in Figs. 5, 6, and 7.

The top A may be supported by the vehicle body structure in any conventional manner, not shown, and it includes a shell member which, depending upon the type of the top construction, may define a recess 9 which receives the outer top or roof panel 6, and which is provided along its longitudinal and transverse edges with angles defining longitudinal inturned flanges 11, 11' and an end flange defining a transverse inturned flange 13 at the forward end of the recess, these flanges forming the seats for the outer panel 6, this panel resting at the rear on the rear portion 15 of the top shell.

The top recess 9 may be made open, and the ribs 10 extend transversely of this opening to brace the shell, the ribs 10 following the general transverse curvature of the shell. The ribs 10 are secured suitably to the vehicle body structure. This opening in the top recess 9 becomes closed by the upper insulating layer 16 when the latter is installed. This layer 16 rests upon the brace ribs 10 and is appropriately secured thereto, and it may overlie the said flanges and edge of the top portion 15 to provide a complete and tight closure for the top.

The top shell member may be braced also by one or more transverse channel members 17 which are secured in any suitable manner to the frame of the body. Such channel members also provide securing members for the lower insulating layer 18 which is turned down at its abutting end as indicated at 19 (Fig. 7) and suitably fastened as by welding. The layer 18 also is turned down onto the sides of the body frame so as to cover the intersection of the sides of the body and the top, as designated at 21. Additional sheets of the improved insulation may be applied also over the exterior of this intersection, that is, the roof side rail panels, as shown at 23 in Fig. 5, for example, fastening devices such as nails or the like, indicated at 25, securing these sheets in place, or the sheets may be welded in place where the underlying top construction is made of steel.

The sheets making up the layers 16 and 18 may be stiffened by longitudinal corrugations 27 which form oppositely extending stiffening ribs in the sheets, similar ribs being shown at 27a in the roof side rail panels in Fig. 5.

Obviously, the details of the installation may be varied widely as determined by each individual case.

It will be understood that the layers 16 and 18 preferably are made up of individual sheets in side by side and end to end contiguity so as to extend from one side to the other of the car, forming spaced insulating panels in the air space between the outer top member 6 and the inner fabric finishing member 8, the spacing between these successive members being uniformly about ½ inch, this being found to give maximum insulating efficiency. The layers 16 and 18 are spaced sufficiently away from the members 6 and 8 to avoid vibrating against them and against each other, thereby preventing objectionable rattling.

The heat insulating layers may be either plane, or the sheets forming the top insulating panel may have this surface provided with a plurality of angularly disposed plane surface portions 28, forming stiffening elevations 30, which are disposed over the ribs 10 and between the felt spacers 12 and the ribs 10 and secured in place thereby. These portions 28 also provide the proper spacing between the elements of the top construction, as aforesaid. The outer covering 6 also is secured to the felt spacer strips 12, these felt strips being placed and secured on top of the sheet 16 after placement of the latter.

By forming the layer 16 in this manner, it is stiffened against vibration and the portions thereof between the bars 10 are spaced sufficiently from the top 6 to prevent vibrations of the top or layer bringing them into engagement with each other to cause rattling, and also to provide suitable spacing for maximum insulation. To assure these results, the length of the sloping surfaces 26 is made sufficient to bring the intermediate portions of the insulating layer a safe distance below the outer top member 6, that is to say about one-half inch, for example. If desired, however, the layer 16 may be a plane sheet, as will be apparent.

It will be understood that the felt strips 12 and 14 extend along the entire length of the ribs 10 and are suitably secured thereto on the top and bottom thereof, respectively, the bottom strip 14 being illustrated as being thicker than the top strip 12 although his detail again is one of choice. However, it should be sufficiently thick to prevent the lower panel 18 and the inner finishing fabric 8 from vibrating against each other. The felt strips 12 and 14 are applied and secured over the insulating layers 16 and 18, respectively.

The lower layer 18 is illustrated as being substantially plane except for the corrugations 27 in the sheets thereof, which sheets are secured by nailing or the like to the underside of the ribs 10 and, the felt strips 14 then are applied and secured by adhesive or otherwise. The fabric 8 is secured to these felt strips 14 by a suitable adhesive, tacks or the like. The corrugations 27 extend in opposite directions from the surface of the sheets in order to provide for maximum stiffening of the sheets which, in practice, may be quite thin.

It will be apparent that the details of the top construction as are herein described are subject to wide variation without departing from the inventive concept.

The floor construction is illustrated in detail in Figs. 3 and 4, and generally in Fig. 1, wherein 32 represents a removable floor-board section provided on its underside with a metal housing 34 suitably secured thereto, and formed of appropriately fitted parts such as are shown in Fig. 3, for example. This housing 34 encloses an air space 36 and the housing 34 encloses also sheets or panels 38 and 40 of the improved insulating material, which are suitably spaced from the flooring 32 and from each other by felt spacers, 42, 44, and which are secured properly by fastening devices, such as screws or nails 46 which pass through the insulating plates 38 and 40 and the felt spacers 42, 44 to enter the flooring 32.

The remainder of the flooring 48 has secured to its underside a metal housing 50, secured to the flooring 48 by screws or the like 52, and which defines an air space 54. Within the housing 50 there is located an insulating sheet or panel 56 which is secured to the flooring 56 by fastening members 58, such as screws or the like. The insulating sheets cover substantially the entire underside of the floor area and extend rearwardly in the housing 50 to the rear extremity of the rear tonneau 60, as is shown in Fig. 1, in which view 62 represents the muffler and 64 the exhaust pipes.

It will be apparent, of course, that in addition to the use of the approved insulation as has been explained in detail herein, the insulating sheets may be applied elsewhere in the construction, such as at the rear of the body, as indicated at 66 in Fig. 7, and also, if desired, around the doors and windows.

From the foregoing consideration, it will be understood that the invention is not limited, necessarily, to the specific details of the construction as are herein specifically illustrated and described, but it will be apparent that such details are subject to various modifications which will become apparent readily to one siklled in the art, without departing from the spirit of the invention; and it will be understood, therefore, that it is intended and desired to include within the scope of the invention such modifications and changes as may be necessary to adapt it to varying conditions and uses. It is also to be understood that the following claims are intended to cover all of the generic and specific features of the invention herein described, and all statements of the scope of the invention which, as a matter of language, might be said to fall therebetween.

What is claimed is:

1. A pleasure vehicle comprising the combination with a body, of a top structure therefor comprising spacing members extending transversely of the top, spaced top-forming members providing a substantially planar and closed air space, means mounted in the space dividing the latter into a plurality of horizontal, superimposed, substantially planar air spaces substantially parallel with each other, the said means comprising spaced superposed metallic layers comprising a steel base having a non-rustable surface presenting high reflective characteristics when exposed to infra-red radiation, upstanding spacing members in the upper layer for spacing the layer from the top-forming members, the lower layer being substantially plane over its entire surface, and means for securing the said lower layer in spaced relation relative to the upper layer and to the top-forming members.

2. A pleasure vehicle, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members, a plurality of relatively thin flanged sheets of metal having non-corrosive surfaces highly reflective to infra-red radiation, mounted by means of said flanges on said reinforcing ribs in spaced relation to each other and to said top members.

3. A pleasure vehicle, comprising the combination with the body, of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members a pair of relatively thin sheets of terneplate disposed in spaced relation to each other and to said top members, one of said sheets being flanged for mounting on said reinforcing ribs in a plane other than that of the rib side whereon it is mounted, the other of said sheets being substantially flat and secured to the opposite side of said ribs from said first-named sheet.

4. A pleasure vehicle, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members a pair of relatively thin sheets of terneplate disposed in spaced relation to each other and to said top members, the upper of said sheets being flanged for mounting on the upper side of said reinforcing ribs in a plane below that of the said upper rib side, the lower of said sheets being substantially flat and secured to the lower side of said ribs.

5. A pleasure vehicle, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members a pair of relatively thin sheets of terneplate disposed in spaced relation to each other and to said top members, the upper of said sheets comprising a series of complementary sheets extending each from one of said reinforcing ribs to its adjacent rib and being flanged for mounting on the upper side of said reinforcing ribs in a plane below that of the said upper rib side, the lower of said sheets being substantially plane and secured to the lower side of said ribs.

6. A pleasure vehicle, comprising the combination with the body of a top portion comprising, spaced inner and outer members defining between them a closed air space, reinforcing transverse ribs disposed within said space, and insulating means within said air space and comprising, in combination, with said top members, relatively thin flanged sheets of metal highly reflective to infra-red radiation mounted by means of said flanges on said reinforcing ribs in spaced relation to said top members, and additional layers of the said insulating sheets disposed externally of the said top portion and overlying the intersections of the top and body.

7. A pleasure vehicle, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members, a plurality of relatively thin flanged sheets of metal having non-corrosive surfaces highly reflective to infra-red radiation, mounted by means of said flanges on said reinforcing ribs in spaced relation to each other and to said top members, and additional layers of the said insulating sheets disposed externally of the said top portion and over-lying the intersections of the top and body.

8. A pleasure vehicle, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members a pair of relatively thin sheets of terneplate disposed in spaced relation to each other and to said top members, the upper of said sheets being flanged for mounting on the upper side of said reinforcing ribs in a plane below that of the said upper rib side, the lower of said sheets being substantially flat and secured to the lower side of said ribs, and additional layers of the said insulating sheets disposed externally of the said top portion and overlying the intersections of the top and body.

9. An automobile, comprising the combination with the body of a top portion comprising, spaced inner and outer top members defining between them a closed air space, reinforcing transverse ribs disposed within said space, heat-insulating spacer means between said ribs and said top members, and heat-reflecting insulating means disposed within said air space and comprising, in combination, with said top members, a plurality of relatively thin flanged sheets of metal having non-corrosive surfaces highly reflective to infra-red radiation, mounted by means of said flanges on said reinforcing ribs in spaced relation to each other and to said top members.

CARL D. WALLACH.